(12) United States Patent
Ito (10) Patent No.: US 8,043,398 B2
(45) Date of Patent: Oct. 25, 2011

(54) HONEYCOMB STRUCTURE, METHOD OF MANUFACTURING HONEYCOMB STRUCTURE, EXHAUST GAS TREATING APPARATUS, AND METHOD OF MANUFACTURING EXHAUST GAS TREATING APPARATUS

(75) Inventor: Toshihide Ito, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 380 days.

(21) Appl. No.: 11/925,459

(22) Filed: Oct. 26, 2007

(65) Prior Publication Data
US 2008/0236122 A1  Oct. 2, 2008

(30) Foreign Application Priority Data
Mar. 29, 2007 (WO) .................. PCT/JP2007/056964

(51) Int. Cl.
*B01D 46/00* (2006.01)
(52) U.S. Cl. ................ 55/523; 55/524; 422/177; 60/311
(58) Field of Classification Search ............ 55/522–524; 422/169–182; 502/303; 60/297
See application file for complete search history.

(56) References Cited

U.S. PATENT DOCUMENTS

| | | | | |
|---|---|---|---|---|
| 3,943,064 A | * | 3/1976 | Ballain et al. | 502/439 |
| 4,632,683 A | * | 12/1986 | Fukutani et al. | 55/523 |
| 5,292,799 A | * | 3/1994 | Naito et al. | 524/783 |
| 5,853,473 A | * | 12/1998 | Donaldson | 106/695 |
| 7,396,586 B2 | | 7/2008 | Ohno et al. | |
| 2004/0065068 A1 | * | 4/2004 | Otsubo et al. | 55/523 |
| 2004/0166035 A1 | * | 8/2004 | Noda et al. | 422/180 |
| 2005/0095179 A1 | | 5/2005 | Kasai et al. | |
| 2005/0106356 A1 | | 5/2005 | Ikeshima et al. | |
| 2005/0229565 A1 | | 10/2005 | Yoshida | |
| 2006/0021310 A1 | | 2/2006 | Ohno et al. | |
| 2006/0051556 A1 | | 3/2006 | Ohno et al. | |
| 2006/0159602 A1 | * | 7/2006 | Ohno et al. | 422/211 |
| 2007/0178275 A1 | | 8/2007 | Takahashi | |
| 2007/0196620 A1 | | 8/2007 | Ohno et al. | |
| 2007/0212517 A1 | | 9/2007 | Ohno et al. | |
| 2008/0083202 A1 | | 4/2008 | Kunieda et al. | |
| 2008/0120950 A1 | | 5/2008 | Ohno et al. | |
| 2008/0136062 A1 | | 6/2008 | Kasai et al. | |
| 2008/0138567 A1 | | 6/2008 | Ninomiya et al. | |
| 2008/0174039 A1 | | 7/2008 | Saijo et al. | |
| 2008/0211127 A1 | | 9/2008 | Naruse et al. | |
| 2008/0213485 A1 | | 9/2008 | Shibata | |

(Continued)

FOREIGN PATENT DOCUMENTS

EP  0476277  3/1992

(Continued)

*Primary Examiner* — Duane Smith
*Assistant Examiner* — Amber Orlando
(74) *Attorney, Agent, or Firm* — Ditthavong Mori & Steiner, P.C.

(57) ABSTRACT

A honeycomb structure including plural cells with holes arranged in a longitudinal direction, a peripheral wall, and a defective portion formed on the peripheral wall that is mended with a mending material that is in a color different from the color of the peripheral wall. Also, a method is provided for manufacturing a honeycomb structure including plural cells with holes arranged in a longitudinal direction and a peripheral wall which method involves mending a defective portion formed on the peripheral wall of the honeycomb structure with a mending material in a color different from the color of the peripheral wall.

65 Claims, 4 Drawing Sheets

| U.S. PATENT DOCUMENTS | | |
|---|---|---|
| 2008/0236115 A1 | 10/2008 | Sakashita |
| 2008/0236724 A1 | 10/2008 | Higuchi |
| 2008/0241015 A1 | 10/2008 | Kudo et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |

| FOREIGN PATENT DOCUMENTS | | |
|---|---|---|
| EP | 1535664 | 6/2005 |
| JP | 2003-260322 | 9/2003 |
| JP | 2005-144284 | 6/2005 |
| WO | WO 2005/099865 | 10/2005 |

* cited by examiner

HONEYCOMB STRUCTURE, METHOD OF MANUFACTURING HONEYCOMB STRUCTURE, EXHAUST GAS TREATING APPARATUS, AND METHOD OF MANUFACTURING EXHAUST GAS TREATING APPARATUS

CROSS-REFERENCE TO RELATED APPLICATION

The present application claims priority to PCT Application No. PCT/JP2007/056964, filed on Mar. 29, 2007, the entire contents of which are hereby incorporated by reference.

BACKGROUND OF THE INVENTION

1. Field of the Invention

The present invention relates to treatment of a gas stream, such as an exhaust gas stream of an internal combustion engine.

2. Discussion of the Background

Particulates such as soot contained in exhaust gas discharged from internal combustion engines of vehicles such as buses and trucks, construction machines, and the like, for example, are harmful to the environment as well as humans. In turn, a variety of exhaust gas treating apparatuses have been developed that use a honeycomb structure made of porous ceramic as a filter for capturing particulates contained in the exhaust gas to purify the exhaust gas. Such an exhaust gas treating apparatus may be manufactured by arranging the surface of the honeycomb structure to carry a catalyst such as platinum. Also, certain exhaust treating apparatuses may be arranged to carry alkaline earth metals such as Ba to be used as a NOx absorbing agent for treating NOx under an oxidizing atmosphere in a lean burn engine or a diesel engine, for example.

It is noted that defects such as holes or scratches may be formed on the honeycomb structure during the manufacturing process of the honeycomb structure or the manufacturing process of the exhaust gas treating apparatus. Japanese Laid-Open Patent Publication No. 2005-144284 discloses a ceramic honeycomb structure having plural flow paths partitioned by plural partition walls and an outer wall that separates the flow paths from the exterior, wherein at least one defective portion corresponding to a hole with a width of 0.1 mm or more formed on the outer wall surface and connected to at least one of the flow paths is sealed with ceramic material. The entire contents of Japanese Laid-Open Patent Publication No. 2005-144284 are incorporated herein by reference.

SUMMARY OF THE INVENTION

According to one embodiment of the present invention, a honeycomb structure is provided that includes plural cells with holes arranged in a longitudinal direction and a peripheral wall surrounding the cells, wherein the peripheral wall has a mended defective portion formed of a mending material that is in a color different from a color of a material of a remaining portion of the peripheral wall.

According to another embodiment of the present invention, a method is provided for manufacturing a honeycomb structure, the method involving forming plural cells with holes arranged in a longitudinal direction, forming a peripheral wall surrounding the cells, and mending a defective portion that is formed on the peripheral wall of the honeycomb structure with a mending material that is in a color different from a color of a material of the peripheral wall.

According to another embodiment of the present invention, an exhaust gas treating apparatus is provided that includes a honeycomb structure including plural porous cells with holes arranged in a longitudinal direction and a peripheral wall surrounding the cells, wherein the peripheral wall has a mended defective portion formed of a mending material that is in a color different from a color of a material of a remaining portion of the peripheral wall; a supporting sealant member arranged at a periphery of the honeycomb structure; and a metal container in which the honeycomb structure is accommodated.

According to another embodiment of the present invention, a method is provided for manufacturing an exhaust gas treating apparatus, the method involving forming a honeycomb structure including plural cells with holes arranged in a longitudinal direction and a peripheral wall surrounding the cells, mending a defective portion that is formed on the peripheral wall of the honeycomb structure with a mending material that is in a color different from a color of the peripheral wall, forming a supporting sealant member arranged at a periphery of the honeycomb structure, and accommodating the honeycomb structure within a metal container.

BRIEF DESCRIPTION OF THE DRAWINGS

Various features of the present invention will be apparent from the following detailed description when read in conjunction with the accompanying drawings, wherein.

DETAILED DESCRIPTION OF THE EMBODIMENTS

Embodiments of the present invention will now be described with reference to the accompanying drawings, wherein like reference numerals designate corresponding or identical elements throughout the various drawings.

A honeycomb structure according to an embodiment of the present invention includes plural porous cells with holes arranged in a longitudinal direction and a peripheral wall surrounding the cells, wherein the peripheral wall has a mended defective portion formed of a mending material that is in a color different from a color of a material of a remaining portion of the peripheral wall.

A method of manufacturing a honeycomb structure according to an embodiment of the present invention includes forming plural cells with holes arranged in a longitudinal direction, forming a peripheral wall surrounding the cells, and mending a defective portion that is formed on the peripheral wall of the honeycomb structure with a mending material that is in a color different from a color of a material of the peripheral wall.

According to the description in Japanese Laid-Open Patent Publication No. 2005-144284, the ceramic material used to seal the defective portion of the ceramic honeycomb structure is made of the same material as the ceramic material used to create this honeycomb structure. Therefore, it is difficult to identify the defective portion of the ceramic honeycomb structure and the stage at which such a defective portion has been formed (including after usage of the honeycomb structure).

An aspect of the present invention is directed to providing a honeycomb structure and a method of manufacturing the honeycomb structure for enabling identification of a defective portion and the stage at which such a defective portion has been formed (including after usage of the honeycomb structure). Another aspect of the present invention is directed to providing an exhaust gas treating apparatus that includes a honeycomb structure enabling identification of a defective portion and the stage at which such a defective portion has been formed (including after usage of the honeycomb structure) and a method of manufacturing such an exhaust gas treating apparatus.

Figure 1:
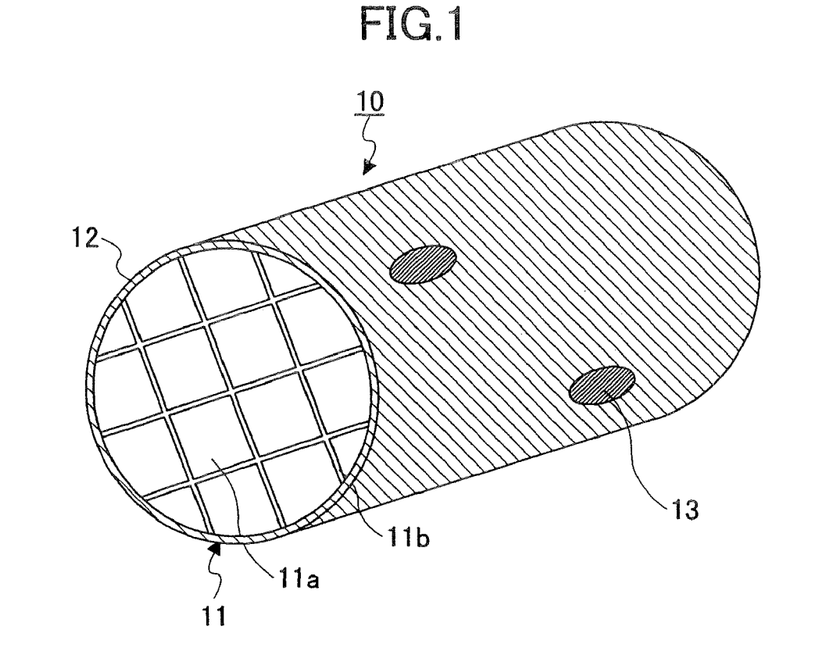
FIG. 1 is a perspective view of a honeycomb structure according to an embodiment of the present invention.

FIG. 1 shows an example of a honeycomb structure according to an embodiment of the present invention. The illustrated honeycomb structure 10 includes a cylindrical honeycomb block 11 that is formed by bonding together plural square-pillar shaped honeycomb units 11a by interposing an adhesive layer 11b and cutting the peripheral face of the bonded structure, and a coating layer 12 arranged around the peripheral face of the honeycomb block 11. Further, the honeycomb structure 10 has mended portions 13 corresponding to holes, scratches, or the like, formed on the coating layer 12 that are mended with a mending material in a color different from the color of the coating layer 12. It is noted that in one preferred embodiment, the defective portions may be mended with plural kinds of mending materials in plural different colors. In this way, it may be possible to identify the defective portions and also determine the stage at which such defect portions have occurred (including after usage of the honeycomb structure). Specifically, plural kinds of mending materials in different colors may be used to indicate the process stage (e.g., process of manufacturing the honeycomb structure, process of arranging the catalyst on the honeycomb structure, process of assembling the exhaust gas treating apparatus, or the like) at which a given defective portion has occurred, for example. It is noted that although the honeycomb structure 10 and the honeycomb block 11 are arranged into cylindrical shapes in the present example, the present invention is not limited to such an example, and the honeycomb structure and honeycomb block according to an embodiment of the present invention may be arranged into other pillar shapes such as cylindroid shapes or rectangular pillar shapes, for example. Also, the shape of the honeycomb unit 11a is not limited to any particular shape. Further, in one embodiment, the honeycomb block may be formed by a single honeycomb unit. In another embodiment, the peripheral face of the honeycomb block may not be cut.

Figure 2:
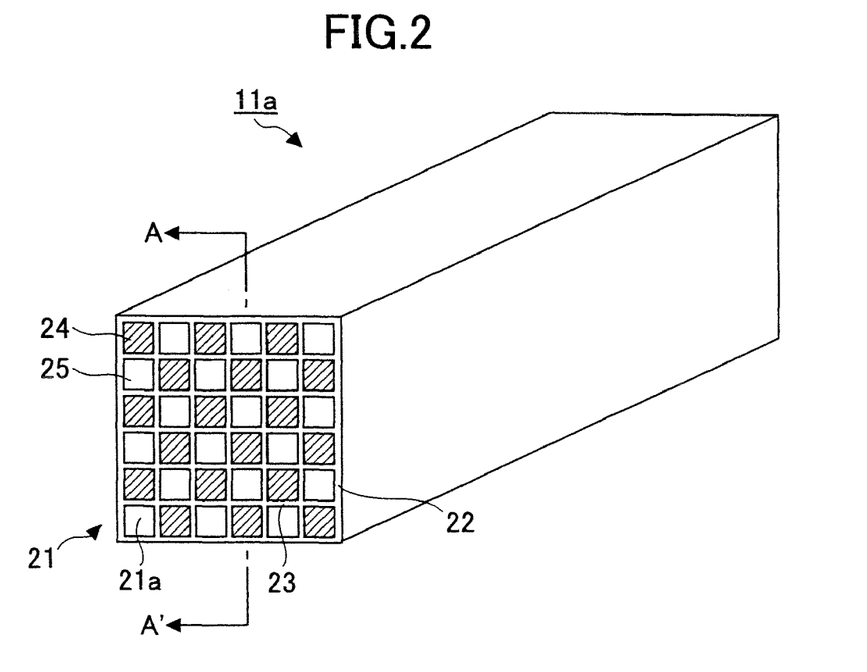
FIG. 2 is a perspective view of a honeycomb unit of the honeycomb structure shown in FIG. 1.
Figure 3:
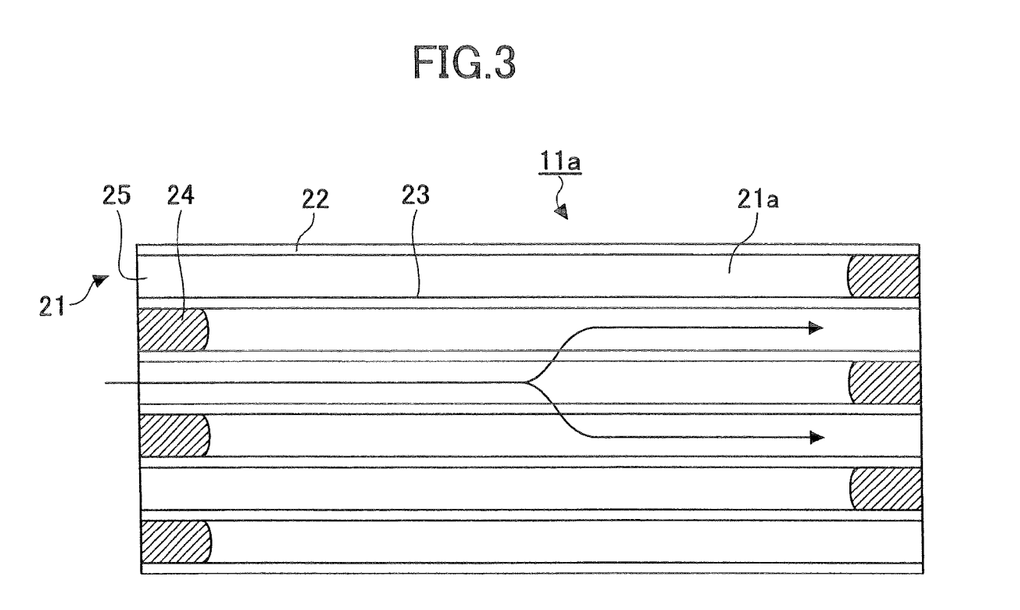
FIG. 3 is a cross-sectional view of the honeycomb unit of the honeycomb structure shown in FIG. 1.

As is shown in FIGS. 2 and 3, the honeycomb unit 11a has plural cells 21 with holes 21a that are arranged in a longitudinal direction and an outer wall 22 surrounding the periphery of the honeycomb unit 11a. It is noted that FIG. 3 is a cross-sectional view of the honeycomb unit 11a cut across line A-A shown in FIG. 2. In the illustrated honeycomb unit 11a, partition walls 23 partitioning the holes 21a of adjacent cells 21 function as a filter. Specifically, exhaust gas inlet side ends and outlet side ends of the holes 21a are arranged into sealed portions 24 that are sealed with a sealing material and opening portions 25 that are not sealed with the sealing material, and exhaust gas entering a given inlet side opening portion 25 passes through the partitioning walls 23 to flow out of outlet side opening portions 25.

The honeycomb unit 11a is preferably made of a porous ceramic material, which may be a nitride ceramic such as aluminum nitride, silicon nitride, boron nitride, or titanium nitride; a carbide ceramic such as silicon carbide, zirconium carbide, titanium carbide, tantalum carbide, or tungsten carbide; or an oxide ceramic such as alumina, zirconia, cordierite, mullite, silica, or aluminum titanate, for example. Among these exemplary ceramic materials or the like, silicon carbide ceramic is particularly preferred owing to its high thermal resistance, good mechanical properties, and high thermal conductivity. It is noted that silicon carbide ceramic refers to a ceramic material containing silicon carbide at approximately 60 wt % or more.

Also, the honeycomb unit 11a may be made of more than one kind of materials such as a composite of silicon and silicon carbide. In the case of using a composite of silicon and silicon carbide, the composite preferably contains silicon at approximately 5 wt % through approximately 45 wt %.

In the case where the honeycomb block is formed by one single honeycomb unit, cordierite or aluminum titanate that have good thermal impact properties is preferably used.

According to an embodiment of the present invention, although the average hole size of the honeycomb unit 11a is not limited to particular size, it is preferably within a range of approximately 1 μm through approximately 100 μm. That is, when the average hole size is approximately 1 μm or more, pressure loss increase may be prevented, and when the average hole size is approximately 100 μm or less, particulate capturing efficiency degradation may be prevented, for example.

Also, although the porosity of the honeycomb unit 11a is not particularly limited, it is preferably within a range of approximately 20% through approximately 80%. That is, when the porosity is approximately 20% or more, clogging in the case of capturing particulates may be prevented, and when the porosity is approximately 80% or less, durability degradation of the honeycomb structure 10 may be prevented. It is noted that the porosity of the honeycomb unit 11a may be measured using a known method such as the mercury intrusion porosimetry method, the Archimedes method, or the scanning electron microscope (SEM) method.

Also, although the aperture (open area) ratio of the honeycomb unit 11a is not particularly limited, it is preferably within a range of approximately 50% through approximately 80%. That is, when the aperture ratio is approximately 50% or more, pressure loss increase may be prevented, and when the aperture ratio is approximately 80% or less, durability degradation of the honeycomb structure 10 may be prevented.

According to an embodiment of the present invention, the thickness of the partition wall 23 is preferably within a range of approximately 0.1 mm through approximately 0.5 mm, and more preferably within a range of approximately 0.1 mm through approximately 0.35 mm. When the thickness of the partition wall 23 is approximately 0.1 mm or more, durability degradation of the honeycomb structure may be prevented. Also, when the thickness of the partition wall 23 is approximately 0.5 mm or less, pressure loss increase may be prevented. Further, in the case of using the honeycomb structure 10 in an exhaust gas treating (purifying and/or converting) apparatus as is described below, the thermal capacity of the honeycomb structure 10 may increase and exhaust gas may not be treated immediately after the engine is started, for example.

According to an embodiment of the present invention, the sealing portion 24 is preferably formed by the same porous ceramic material as the outer wall 22 and the partition wall 23. In this way, the adhesion between the outer wall 22, the partition wall 23, and the sealing portion 24 may be easily strengthened. Further, the porosity of the sealing portion 24 is preferably arranged to be the same as the outer wall 22 and the partition wall 23 so that the coefficients of thermal expansion of the outer wall 22, the partition wall 23, and the sealing portion 24 may be easily matched. In this way, even when thermal stress is applied during manufacture or usage of the honeycomb structure 10, gaps may not easily occur between the sealing portion 24 and the outer wall 22 and/or partition wall 23 and cracking of the sealing portion 24 or the connecting portion between the sealing portion 24 and the outer wall 22 and/or partition wall 23 may be easily prevented, for example.

Although the thickness of the sealing portion 24 is not particularly limited, in the case where the sealing portion 24 is made of porous silicon carbide, the thickness is preferably within a range of approximately 1 mm thorough approximately 20 mm, and more preferably within a range of approximately 3 mm through approximately 10 mm. It is noted that sealing portions may be provided in the honeycomb structure 10 as is necessary or desired. For example, the sealing portions may be provided when the honeycomb structure 10 is to be used for capturing particulates. That is, a honeycomb structure including sealing portions may be used as a filter for capturing particulates. On the other hand, a honeycomb structure that does not include sealing portions may be used as a catalyst carrier for converting harmful substances such as CO, HC, and/or NOx contained in exhaust gas, for example.

According to an embodiment of the present invention, the adhesive layer 11b has a function of absorbing thermal expansion of the honeycomb structure 10 as well as a function of bonding the plural honeycomb units 11a. Further, the adhesive layer 11b may have a function of preventing leakage of exhaust gas, for example.

The adhesive layer 11b preferably contains inorganic particles and an inorganic binder. Examples of inorganic particles that may be used include carbides such as silicon carbide, nitrides such as silicon nitride and boron nitride, and the like, or combinations thereof. Of the exemplary inorganic particles, silicon carbide is particularly preferred owing to its good thermal conductivity.

As for the inorganic binder, silica sol, alumina sol, and the like, or combinations thereof may be used, for example. Of these materials, silica sol is particularly preferred.

In one embodiment, the adhesive layer 11b may further contain inorganic fiber, which may be ceramic fiber such as silica-alumina, mullite, or silica fiber; whiskers such as aluminum borate whiskers, and the like; or combinations thereof. Of these materials, silica-alumina fiber is particularly preferred.

The aspect ratio of the inorganic fiber is preferably within a range of approximately 3 through approximately 50. When the aspect ratio is approximately 3 or more, a decrease in contact between the inorganic fibers and inorganic binder may be prevented so that adhesivity degradation of the adhesive layer 11b may be prevented. On the other hand, when the aspect ratio is approximately 50 or less, occurrence of gaps between the inorganic fibers at the adhesive layer 11b may be prevented and adhesivity degradation of the adhesive layer 11b may be prevented. It is noted that the aspect ratio may be obtained by calculating the following formula:

(Average Fiber Length of Inorganic Fiber)÷(Average Fiber Diameter of Inorganic Fiber).

It is noted that the average fiber diameter of the inorganic fiber is preferably within a range of approximately 5.5 μm through approximately 200 μm, and more preferably within a range of approximately 6 μm through approximately 100 μm. The average fiber length of the inorganic fiber is preferably within a range of approximately 18 μm thorough approximately 5000 μm, and more preferably within a range of approximately 20 μm through approximately 2000 μm.

The adhesive layer 11b may be formed by applying an adhesive paste. In this case, an organic binder may be added to the adhesive paste to adjust its viscosity and improve its adhesivity. In this way, adhesivity of the adhesive layer 11b may be improved. It is noted that the viscosity of the adhesive paste is preferably within a range of approximately 20 Pa·s through approximately 35 Pa·s.

The organic binder may include polyvinyl alcohol, methylcellulose, ethylcellulose, carboxymethylcellulose, or combinations thereof, for example. Of the above-mentioned organic binders, carboxymethylcellulose is particularly preferred.

The adhesive paste may contain a hole forming agent as is necessary or desired. The hole forming agent may correspond to balloons, which are hollow microspheres having oxide-based ceramics as their components, spherical acrylic particles, graphite, or the like, for example. The balloons may be alumina balloons, silica-alumina balloons, glass microballoons, Shirasu balloons, fly ash balloons, and the like, for example. Of these balloons, silica-alumina balloons are particularly preferred.

The coating layer 12 is arranged around the periphery of the honeycomb block 11. The coating layer 12 serves as a sealant for preventing exhaust gas from leaking out from the periphery of the ceramic block 11 and a reinforcement for shaping or reinforcing the honeycomb structure 10 when the honeycomb structure 10 is installed in an exhaust passageway in communication with an internal combustion engine.

In one preferred embodiment, the coating layer 12 may include a material similar to that of the adhesive layer 11b. It is noted that the material of the adhesive layer 11b and the material of the coating layer 12 may either be the same or different. Also, when the materials of the adhesive layer 11b and the coating layer 12 are the same, their material composition ratios may either be the same or different.

The mended portion 13 is formed by mending a defective portion formed on the coating layer 12 using a mending material. In one embodiment, a predetermined region of a hole 21a connected to the defective portion may be sealed by the mending material as well. In this way, the mended portion 13 may be reinforced.

It is noted that the mended portion 13 preferably includes a material similar to that of the coating layer 12. In this way, peeling or cracking of the mended portion 13 may be prevented when the honeycomb structure 10 is used in an exhaust gas treating apparatus. Specifically, the difference in the coefficient of thermal expansion between the mended portion 13 and the coating layer 12 is preferably approximately $1 \times 10^{-6}$/K or less, with the mending portion 13 having the lower coefficient of thermal expansion. In this way, cracking, peeling, and the like of the mended portion may be prevented even when expansion or shrinkage of the coating layer 12 occurs upon drying the mended portion 13. Such effects may be further enhanced when the drying temperature at the time of mending a defective portion with the mending material is lower than the drying temperature at the time of manufacturing the honeycomb structure 10.

Also, the mending material preferably contains a pigment for coloring the mended portion 13. For example, the pigment may be any one or a combination of the following: selenium red (CdS—CdSe), manganese pink ($Al_2O_3(Mn.P)$), chrome alumina pink ($ZnO.(Cr.Al)_2O_3$), chrome tin pink ($CaO.SnO_2.SiO_2+Cr_2O_3$), antimony yellow ($PbO.Sb_2O_5$), chrome titanium yellow ($TiO_2.Sb_2O_5.Cr_2O_3$), vanadium yellow ($SnO_2.V_2O_5$, $ZrO_2.V_2O_5$), praseodymium yellow ($ZrO_2.SiO_2+PrO_2$), chrome green ($(Cr.Al)_2O_3$), peacock green ($(Zn.Co)O.(Al.Cr)_2O_3$), pea green ($3CaO(F).Cr_2O_3.3SiO_2$), sea green ($CoO.Al_2O_3$, $ZnO.CoO.Al_2O_3$), navy blue ($CoO.Al_2O_3.SiO_2$, $ZnO.CoO.SiO_2$), sky blue ($MgO.CoO.SiO_2$), vanadium blue ($ZrO_2.SiO_2+V_2O_5$), brown ($Zn(Al.Cr.Fe)_2O_3$), black ($(Co.Zn.Mn)O.(Al.Cr.Fe)_2O_3$), antimony oxide ($Sb_2O_3$, $Sb_2O_4$, $Sb_2O_5$) such as gray ($SnO_2.Sb_2O_5$), brown hematite ($FeO_3.H_2O$), yellow ocher, ilmenite ($FeTiO_3$), Asbolite (main component: Fe, Mn, Co, Al, etc.), CuO, $MnO_2$, $MnCO_3$, $MnHPO_4.3H_2O$, $Cr_2O_3$, $PbCrO_4$, $BaCrO_4$, $Cu_2(OH)_2CO_3$, cobalt oxide (CoO, $Co_3O_4$, $Co_2O_3$), cobalt carbonate, neodymium oxide ($Nd_2O_3$), praseodymium oxide ($Pr_6O_{11}$, $Pr_2O_3$), cadmium sulfide (CdS), sodium uranium oxide ($Na_2U_2O_7$), $V_2O_5$, $Ca_3(PO_4)_2$, $SnO_2$, $TiOZrSiO_4$, $ZrO_2$, and the like. Of the above-mentioned exemplary substances that may be used as the pigment, a transition metal composite oxide is particularly preferred. The amount of pigment contained in the mending material is preferably within a range of approximately 0.1 wt % through approximately 10 wt %, and more preferably within a range of approximately 0.5 wt % through approximately 5 wt %. When the amount of pigment contained in the mending material is approximately 0.1 wt % or more, the mending material may be easily colored, and when the amount is approximately 10 wt % or less, coatablity degradation of the mending material may be prevented, for example.

It is noted that a honeycomb structure according to an embodiment of the present invention may have a coating layer formed thereon as is necessary or desired. For example, when the peripheral face of the honeycomb block is not cut, the coating layer does not necessarily have to be formed. In this case, since to the outer wall of the honeycomb block corresponds to the peripheral wall of the honeycomb structure, the honeycomb structure has defective portions formed on the outer wall that are mended by a mending material in a color different from that of the outer wall.

Also, in this case, the mended portion is preferably formed by a material similar to that of the outer wall. In this way, cracking and peeling of the mended portion may be easily prevented when the honeycomb structure is used in an exhaust gas treating apparatus. Specifically, the difference in the coefficient of thermal expansion between the mended portion and the outer wall is preferably approximately $1\times 10^{-6}$/K or less, with the mending portion having the lower coefficient of thermal expansion. In this way, cracking, peeling, or the like of the mended portion may be prevented even when expansion or shrinkage of the outer wall occurs upon drying the mended portion. Such effects may be further enhanced when the drying temperature at the time of mending a defective portion with the mending material is lower than the drying temperature at the time of manufacturing the honeycomb structure.

FIGS. 4-7 are diagrams showing examples of mended portions of honeycomb structures according to embodiments of the present invention. It is noted that in FIGS. 4-7, component elements that are identical to those shown in FIGS. 1-3 are given the same reference numerals and their descriptions are omitted.

Figure 4:
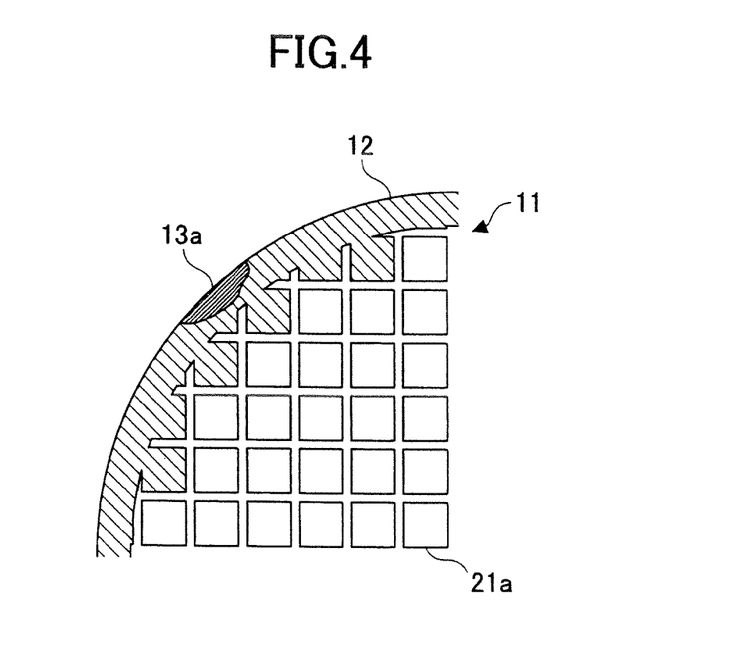
FIG. 4 is a cross-sectional view of a mended portion of a honeycomb structure according to an embodiment of the present invention.

The honeycomb structure shown in FIG. 4 includes a honeycomb block 11 that is cut into a cylindrical shape and a coating layer 12 that is arranged around the periphery of the honeycomb block 11. The illustrated honeycomb structure also has a mended portion 13a that is formed by arranging mending material on a defective portion formed on the coating layer 12 in the process of manufacturing the honeycomb structure. It is noted that the mended portion 13a is in a color (e.g., yellow) different from the color of the coating layer 12 and includes the same material as that of the coating layer 12.

Figure 5:
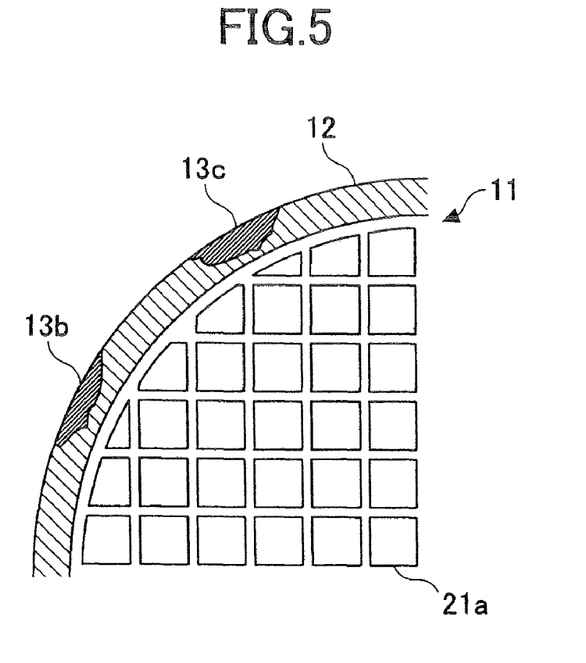
FIG. 5 is a cross-sectional view of a mended portion of a honeycomb structure according to another embodiment of the present invention.
Figure 6:
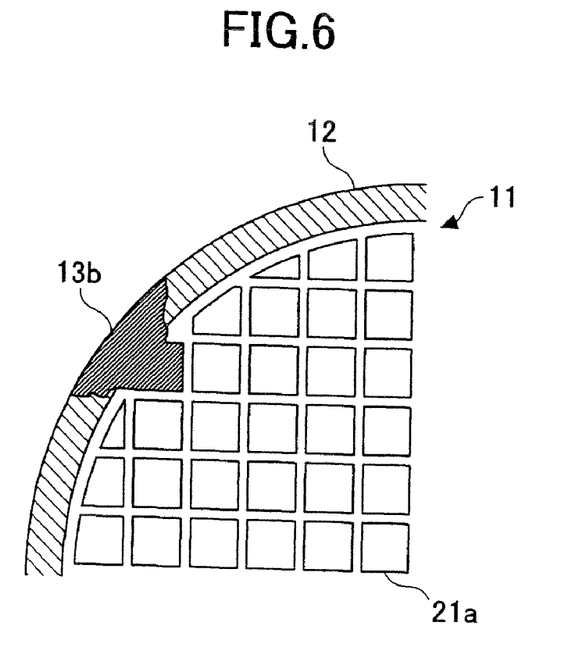
FIG. 6 is a cross-sectional view of a mended portion of a honeycomb structure according to another embodiment of the present invention.

The honeycomb structure shown in FIG. 5 has an outer wall 22 arranged around the periphery of a cylindrical honeycomb block 11 and a coating layer 12 arranged around the outer wall 22. The illustrated honeycomb structure also has a mended portion 13b that is formed by arranging mending material on a defective portion formed on the coating layer 12 in the process of providing a catalyst to be carried by the honeycomb structure, and a mended portion 13c that is formed by arranging mending material on a defective portion formed in the process of assembling an exhaust gas treating apparatus. It is noted that the mended portion 13b of a defective portion formed in the process of providing a catalyst to be carried by the honeycomb structure is in a color (e.g., red) that is different from the color of the coating layer 12 and is mended using a mending material that includes the same material as the coating layer 12. The mended portion 13c of a defective portion formed in the process of assembling the exhaust gas treating apparatus is in a color (e.g., blue) that is different from the color of the coating layer 12 and is mended using a mending material that includes the same material as the coating layer 12. According to a preferred embodiment, in a case where a hole formed on the coating layer 12 in the process of providing the catalyst to the honeycomb structure is mended with mending material, a predetermine region of a hole 21a connected to the hole formed on the coating layer 12 may also be sealed with the mending material to form a mended portion 13b as is shown in FIG. 6.

Figure 7:
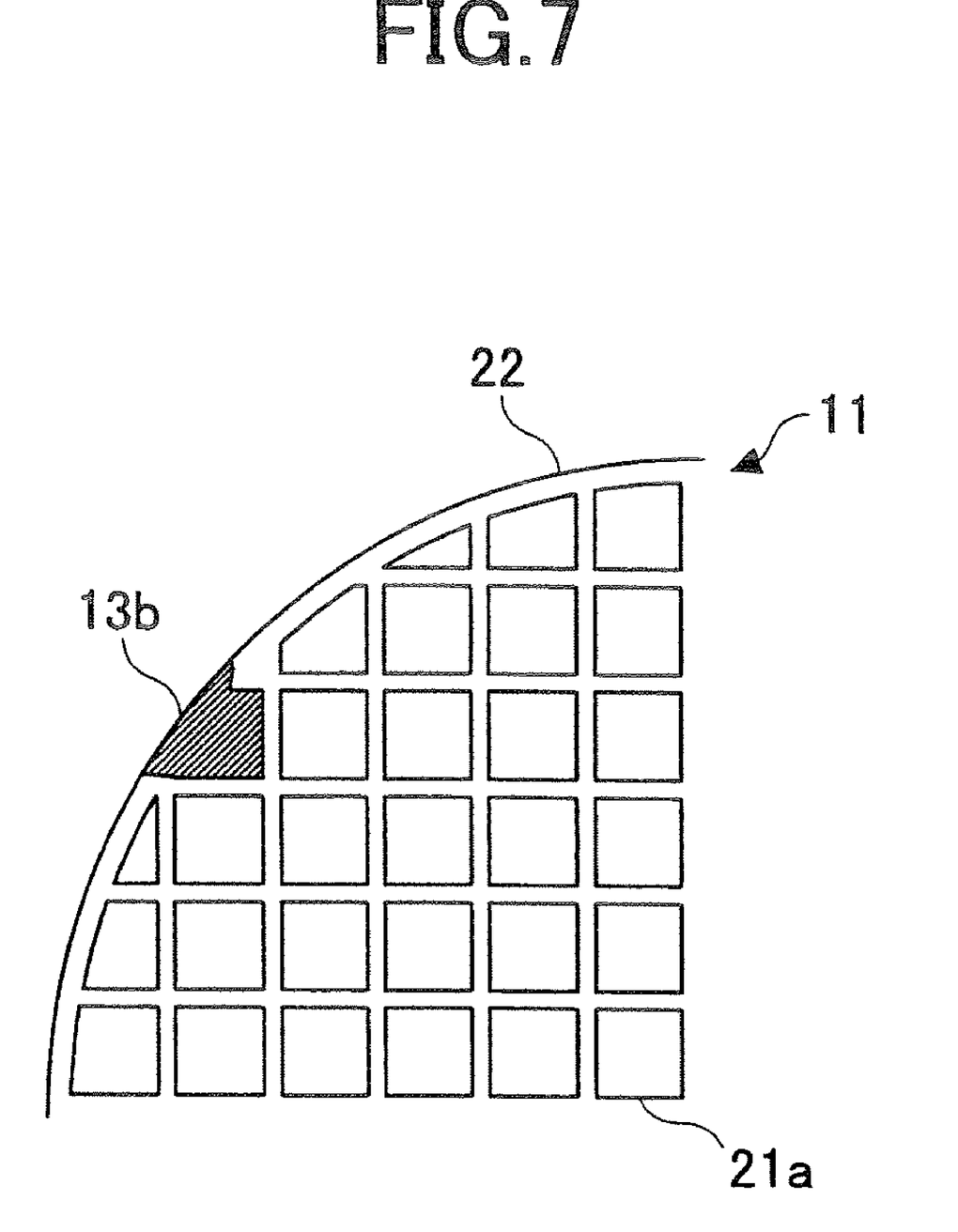
FIG. 7 is a cross-sectional view of a mended portion of a honeycomb structure according to another embodiment of the present invention.

The honeycomb structure shown in FIG. 7 has an outer wall 22 formed on the periphery of a cylindrical honeycomb block 11. The illustrated honeycomb structure also includes a mended portion 13d corresponding to a hole on the outer wall 22 that is formed in the process of manufacturing the honeycomb structure and is mended with mending material. It is noted that the mended portion 13d extends to a predetermined region of a hole 21a connected to this hole which is also sealed by the mending material. The mended portion 13d is in a color (e.g., orange) that is different from the color of the outer wall 22 and is mended by a mending material that includes the same material as that of the outer wall 22.

As can be appreciated, according to an aspect of the present invention, it may be possible to determine the stage at which a defective portion has been formed (e.g., before usage, during usage, or after usage) based on the color of the mended portion.

In a honeycomb structure according to one preferred embodiment of the present invention, the cells may be classified into two cell groups; namely, an inlet side cell group and an outlet side cell group. Each cell belonging to the inlet side cell group has an end portion at one side sealed with a sealing material so that the total area of hole cross sections perpendicular to the longitudinal direction is increased in relativity at an edge face of the honeycomb structure. Each cell belonging to the outlet side cell group has an end portion the other side sealed with a sealing material so that the total area of hole cross sections perpendicular to the longitudinal direction is decreased in relativity at the edge face of the honeycomb structure. The opening area at the edge face of the honeycomb structure may be changed by adjusting the combination of the inlet side cell group and the outlet side cell group.

Combinations of the inlet side cell group and the outlet side cell group include the following:

(1) the holes of the cells belonging to the inlet side cell group and the holes of the cells belonging to the outlet side group have the same cross-sectional area with respect to the direction perpendicular to the longitudinal direction, and the number cells belonging to the inlet side cell group is greater than the number of cells belonging to the outlet side cell group;

(2) the holes of the cells belonging to the inlet side cell group and the holes of the cells belonging to the outlet side group have different cross-sectional areas with respect to the direction perpendicular to the longitudinal direction, and the number cells belonging to each cell group is different as well; and (3) the holes of the cells belonging to the inlet side cell group have a greater cross-sectional area with respect to the direction perpendicular to the longitudinal direction compared to the holes of the cells belonging to the outlet side group, and the number cells belonging to each cell group is the same.

Also, the cells belonging to the inlet side cell group and/or the cells belonging to the outlet side cell group may be arrange to have uniform shapes and perpendicular cross sectional areas, for example. Alternatively, two or more different kinds of cells with different shapes and perpendicular cross sectional areas may belong to a given cell group, for example.

In a honeycomb structure according to another preferred embodiment of the present invention, a catalyst may be carried and supported by the partition walls. Specifically, by arranging the partition walls to carry a catalyst capable of converting harmful gas components contained in exhaust gas such as CO, HC, and NOx, the harmful gas components may be properly converted through catalytic reaction. Also, by arranging the partition walls to carry a catalyst helping combustion of particulates, the burning temperature of the particulates may be reduced so that the particulates may be removed more easily. As a result, the exhaust gas treating (purifying and/or converting) performance may be improved in the honeycomb structure according to the present embodiment.

It is noted that although there are no particular limitations on the catalyst to be used, a catalyst made of noble metal such as platinum, palladium or rhodium may be used, for example. In other examples, catalysts including alkali metals, alkaline-earth metals, rare-earth elements, and/or transition metal elements in addition to the above-mentioned noble metals may be used.

In the following, a method of manufacturing the honeycomb structure 10 is described as an exemplary method for manufacturing a honeycomb structure according to an embodiment of the present invention.

First, raw material paste including the above-mentioned ceramics as its main component is extruded to form a ceramic molded body having a square-pillar shape, for example. Although the raw material paste is not limited to a particular kind, the honeycomb structure manufactured using the raw material paste preferably has a porosity of approximately 20% through approximately 80%. In this respect, a mixture of ceramic powder, a binder, a dispersion medium, and the like may be used as the raw material paste, for example. In one specific example, the ceramic power, the binder, and the dispersion medium may be mixed by an attritor or the like and adequately kneaded by a kneader or the like to then be extruded.

Although the particle size of the ceramic powder is not particularly limited, it is preferable that the ceramic powder have low contraction in a subsequent firing process. For example, 100 w/t parts of powder having an average particle size of approximately 0.3 µm through approximately 70 µm combined with approximately 5 w/t parts through approximately 65 w/t parts of powder having an average particle size of approximately 0.1 µm through approximately 1.0 µm may be used. It is noted that the hole size of the honeycomb structure may be controlled by adjusting the firing temperature and the particle size of the ceramic powder, for example.

Although the binder is not limited to a particular kind, possible examples of the binder include methyl cellulose, carboxymethyl cellulose, hydroxyethyl cellulose, polyethylene glycol, and the like. Normally, the amount of binder added to the raw material paste is preferably within approximately 1 wt % through approximately 15 wt % of the ceramic powder.

Although the dispersion medium is not limited to a particular kind, possible examples of the dispersion medium include an organic solvent such as benzene, alcohol such as methanol, water, and the like. An appropriate amount of the dispersion medium may be added so that the viscosity of the raw material paste may be within a predetermined range.

Also, a molding assistant may be added to the raw material paste as is necessary or desired. Although the molding assistant is not limited to a particular kind, possible examples of the molding assistant include ethylene glycol, dextrin, fatty acid, fatty acid soap, polyvinyl alcohol, and the like.

Further, a hole forming agent such as balloons which are hollow microspheres having oxide-based ceramics as their components, spherical acrylic particles, graphite, or the like may be added to the raw material paste as is necessary. Although the balloons are not limited to a particular kind, possible examples of balloons that may be used include alumina balloons, glass microballoons, Shirasu balloons, fly ash balloons, mullite balloons, and the like. Of these balloons, alumina balloons are particularly preferred.

Next, the ceramic molded body may be dried using a microwave dryer, a hot air dryer, an oven, a dielectric dryer, a decompression dryer, a vacuum dryer, a freeze dryer, or the like, for example, at a temperature of approximately 500° C. through approximately 1000° C., more preferably at approximately 600° C. through approximately 800° C. in order to form a ceramic dried body.

In the case of using the honeycomb structure to capture particulates, a sealing material paste is filled into outlet side end portions of cells belonging to the inlet side cell group and inlet side end portions of cells belonging to the outlet side cell group so that the cells are clogged and sealed up. Although the sealing material paste is not limited to a particular kind, a sealed portion formed by the sealing material paste preferably has a porosity of approximately 30% through approximately 75%. In one preferred example, a paste similar to the above-described raw material paste may be used as the sealing material paste.

Next, the ceramic dried body that has the sealing material paste filled in its cells may be degreased at a temperature of approximately 200° C. through approximately 500° C. and fired at a temperature of approximately 1400° C. through approximately 2300° C., for example, to manufacture a honeycomb unit corresponding to one sintered body formed by porous ceramics. In one example, conditions used for manufacturing a filter formed by porous ceramics according to conventional techniques may be used as the conditions for degreasing and firing the ceramic dried body.

Next, plural honeycomb units are assembled through use of a gap retaining member to form a honeycomb assembled body. The gap retaining member is used to form gaps between the assembled honeycomb units. The thickness of the adhesive layer arranged in between the honeycomb units may be adjusted through adjustment of the thickness of the gap retaining member.

Although the material of the gap retaining member is not limited to a particular kind of material, possible materials include paper such as cardboard, inorganic substance such as graphite, ceramic such as silicon carbide, organic fiber, resin, and the like.

Next, adhesive paste is filled into the gaps formed between the honeycomb units of the honeycomb assembled body. In one example, the adhesive paste may be applied to each honeycomb unit and the honeycomb units may be successively layered to form the honeycomb unit assembled body.

Next, the honeycomb assembled body having the adhesive paste filled into its gaps is heated for approximately one hour at a temperature of approximately 50° C. through approximately 150° C., for example. In this way, the adhesive paste may be dried and solidified to form the adhesive layer. Further, the honeycomb assembled body is cut by a diamond cutter or the like, for example, to form the cylindrical honeycomb block 11. Then, a paste identical to the adhesive paste is used to form the coating layer 12 around the periphery of the honeycomb block 11 so that the honeycomb structure may be manufactured.

Then, a catalyst may be provided to the partition walls 23 of the manufactured honeycomb structure 10 as is necessary or desired. In an alternative embodiment, the honeycomb unit assembled body may be manufactured (assembled) after providing the catalyst to the honeycomb units 11a. In the case of providing the catalyst to the honeycomb structure 10, in one example, a catalyst supporting layer formed by alumina or some other material having a large specific surface area may be formed on the surfaces of the partition walls 23, and a promoter may be provided on this layer along with the catalyst. The catalyst supporting layer may be formed by oxide ceramic such as platinum alumina, titania, zirconia, or silica, for example.

Although the honeycomb structure 10 may be manufactured in the manner described above, a defect such as a hole or a scratch may be formed on the coating layer 12 of the honeycomb structure 10 during its transportation, handling or the like, for example. Such a defective portion may be mended at a certain process stage such as the process of manufacturing the honeycomb structure 10, the process of providing a catalyst to the honeycomb structure, or the process of assembling an exhaust gas treating apparatus using mending material in a color that is different from the color of the coating layer 12. In one preferred embodiment, a mending material in a different color may be used according to the process stage at which the defective portion is mended. In this way, past mending operations may be clearly tracked. Further, when the honeycomb structure 10 is damaged after being installed in a vehicle and used, for example, a determination may be made as to whether the defect has occurred at the mended portion 13 or at a location other than the mended portion 13.

The mended portion 13 is formed using the mending material, which may be made of a paste that is substantially identical to the adhesive paste other than the fact that it includes a colorant. In this case, the drying temperature for forming such a mended portion 13 may be approximately 500° C. through approximately 1000° C. (preferably approximately 600° C. through approximately 800° C.) as with the drying temperature for manufacturing the honeycomb structure 10. However, the drying temperature for manufacturing the honeycomb structure 10 is preferably lower than the drying temperature for forming the mended portion. Specifically, the drying temperature for forming the mended portion is preferably set to approximately 100° C. through approximately 300° C., and more preferably approximately 150° C. through approximately 200° C. Since the area of the defective portion is relatively small, the drying temperature for the mended portion may be set within the above range and a miniature dryer (e.g., batch type dryer) may be used to dry the mended portion in a simple manner to easily reduce power consumption, for example.

Also, a honeycomb structure according to one embodiment that has a honeycomb block made up of one single honeycomb unit may be manufactured in a manner similar to that for manufacturing the honeycomb structure 10 as described above other than the fact that the honeycomb unit 11a is formed as the honeycomb block 11. Also, a mended portion may be formed on such a honeycomb structure in a manner similar to that described above when a defect such as a hole or a scratch occurs on a coating layer of the honeycomb structure.

In a case where a defect such as a hole or a scratch occurs on a honeycomb structure that does not have a coating layer, the defect occurring on the honeycomb structure may be mended in a manner similar to that described above using a mending material in a color different from that of the outer wall 22.

An exhaust gas treating apparatus according to an embodiment of the present invention includes a honeycomb structure including plural porous cells with holes arranged in a longitudinal direction and a peripheral wall surrounding the cells, wherein the peripheral wall has a mended defective portion formed of a mending material that is in a color different from a color of a material of a remaining portion of the peripheral wall; a supporting sealant member arranged at a periphery of the honeycomb structure; and a metal container in which the honeycomb structure is accommodated. Since such an exhaust gas treating apparatus may function as a conventional catalyst carrying DPF (Diesel Particulate Filter), detailed descriptions of the exhaust gas treating apparatus are omitted.

A method of manufacturing an exhaust gas treating apparatus according to an embodiment of the present invention involves forming a honeycomb structure including plural cells with holes arranged in a longitudinal direction and a peripheral wall surrounding the cells, mending a defective portion that is formed on the peripheral wall of the honeycomb structure with a mending material that is in a color different from a color of the peripheral wall, forming a supporting sealant member arranged at a periphery of the honeycomb structure, and accommodating the honeycomb structure within a metal container.

As is described above, the exhaust gas treating apparatus according to an embodiment of the present invention may be manufactured by providing a catalyst to partition walls of a honeycomb structure according to an embodiment of the present invention, arranging a supporting sealant member around the peripheral wall of the honeycomb structure, and accommodating the honeycomb structure with the supporting sealant member within a metal container. However, it is noted that a defect such as a hole or a scratch may be formed on the peripheral wall of the honeycomb structure during its transportation, handling, or the like, for example. Such a defective portion may be mended at a certain process stage such as the process of manufacturing the honeycomb structure, the process of providing a catalyst to the honeycomb structure, or the process of assembling the exhaust gas treating apparatus using mending material in a color that is different from the color of the peripheral wall of the honeycomb structure. In one preferred embodiment, a mending material in a different color may be used according to the process stage at which the defective portion is mended. In this way, past mending operations may be clearly tracked. Further, when the honeycomb structure is damaged after being installed in a vehicle and used, for example, a determination may be made as to whether the defect has been formed at the mended portion or at a location other than the mended portion.

It is noted that conditions for mending a defective portion of the honeycomb structure of the exhaust gas treating apparatus may be identical to the conditions for mending a defective portion of the honeycomb structure 10 as described above.

EXAMPLES

In the following, specific examples are described for illustrating embodiments of the present invention in greater detail.

Plural square-pillar shaped honeycomb units 11a are bonded together by interposing the adhesive layer 11b after which the periphery of the bonded structure is cut by a diamond cutter to form the honeycomb block 11. In the present example, the adhesive layer 11b is formed by applying a gray adhesive paste that is made up of 20 wt % silicon carbide particles with an average particle size of 0.6, m, 26 wt % silica sol containing 30 wt % solid contents, 1 wt % CMC, 30 wt % alumina balloons, and 23 wt % water. Then, coating layer paste having the same composition as that of the adhesive paste is used to form the coating layer 12 at a thickness of 1 mm around the periphery of the honeycomb block 11 to fabricate a honeycomb structure.

Next, alumina films (layers) are formed on the partition walls 23 of the honeycomb structure after which a platinum catalyst is provided on the partition walls 23. Then, an exhaust gas treating apparatus is assembled by arranging a supporting sealant member (mat) around the honeycomb structure carrying the platinum catalyst, and accommodating the honeycomb structure with the supporting sealant member is accommodated inside a metal container (shell).

Example 1

A defective portion formed on the coating layer 12 of a honeycomb structure fabricated in the above-described manner is filled with a red paste, which is made by adding 1 wt % of iron oxide ($Fe_2O_3$) to the coating layer paste. The surface of the defective portion with the red paste is then flattened after which the red paste is dried for 60 minutes at a temperature of 180° C. The honeycomb structure 10 having a defective portion mended in this way to form a mended portion 13 is used in assembling an exhaust gas treating apparatus.

Example 2

A defective portion that is formed on the coating layer 12 of a honeycomb structure carrying the platinum catalyst is filled with a blue paste, which is made by adding 1 wt % of $CoO.Al_2O_3$ to the coating layer paste. The surface of the defective portion with the blue paste is then flattened after which the blue paste is dried for 60 minutes at a temperature of 180° C. The honeycomb structure 10 having a defective portion mended in this way to form a mended portion 13 is used in assembling an exhaust gas treating apparatus.

Example 3

A defective portion that is formed on the coating layer 12 of a honeycomb structure that is to be accommodated inside a metal container (shell) is filled with a yellow paste, which is made by adding 1 wt % of $ZrO_2.V_2O_5$ to the coating layer paste. The surface of the defective portion with the yellow paste is then flattened after which the yellow paste is dried for 60 minutes at a temperature of 180° C. The honeycomb structure 10 having a defective portion mended in this way to form a mended portion 13 is used in assembling an exhaust gas treating apparatus.

Comparative Example 1

A defective portion that is formed on a coating layer of a honeycomb structure that is to be accommodated inside a metal container (shell) is filled with the coating layer paste that does have a pigment added thereto. The surface of the defective portion with the paste is then flattened after which the paste is dried for 60 minutes at a temperature of 180° C. The honeycomb structure having a defective portion mended in this way to form a mended portion is used in assembling an exhaust gas treating apparatus.

Evaluation Method and Evaluation Result:

Regenerating tests were conducted using the exhaust gas treating apparatuses of EXAMPLES 1-3 and COMPARATIVE EXAMPLE 1. Specifically, the regenerating tests were conducted by arranging each of the exhaust gas treating apparatuses in an exhaust pipe of an engine (2 L direct-injection engine), operating the engine for nine hours at a rotation speed of 2000 rpm and a torque of 100 Nm, having the honeycomb unit capture approximately 18.8 g/L of soot, switching the operation mode of the engine to post-injection mode in order to burn the captured soot, and controlling the temperature at the entrance of the honeycomb structure to be approximately 600° C. one minute after starting the post-injection mode operation. After burning the soot, the engine was stopped and the honeycomb structure was removed from the exhaust gas treating apparatus.

After conducting such tests, a distinction could still be made between the coating layer 12 and the mended portion 13 in the honeycomb structures 10 of EXAMPLES 1-3; however, a distinction between the coating layer and the mended portion could not be made in the honeycomb structure of COMPARATIVE EXAMPLE 1.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

What is claimed as new and desired to be secured by Letters Patent of the United States is:

1. A honeycomb structure comprising:
   a plurality of cells with holes arranged in a longitudinal direction; and
   a peripheral wall surrounding said plurality of cells,
   the peripheral wall is composed of a coating layer dried, solidified, and formed on a peripheral portion of a honeycomb block,
   wherein said peripheral wall has a mended defective portion formed of a mending material that is in a color different from a color of a material of a remaining portion of the peripheral wall and the mended portion is dried and formed after mending with a mending material including a material identical to that of the coating layer.

2. The honeycomb structure as claimed in claim 1, wherein a peripheral face of the honeycomb block is cut.

3. The honeycomb structure as claimed in claim 1, wherein the cells arranged in the longitudinal direction make up a honeycomb unit, and the honeycomb block is formed by bonding together a plurality of the honeycomb units by interposing an adhesive layer.

4. The honeycomb structure as claimed in claim 1, wherein the cells arranged in the longitudinal direction make up a honeycomb unit, and the honeycomb units are bonded together by interposing an adhesive layer.

5. The honeycomb structure as claimed claim 1, wherein the mended defective portion is connected to at least one of the holes and a predetermined region of said at least one of the holes connected to the mended defective portion is sealed by the mending material.

6. The honeycomb structure as claimed in claim 1, wherein a plurality of mended defective portions are mended using a plurality of kinds of mending materials in a plurality of different colors.

7. The honeycomb structure as claimed in claim 1, wherein the mending material includes a pigment.

8. The honeycomb structure as claimed in claim 1, further comprising a catalyst carried by at least one of said plurality of cells.

9. The honeycomb structure as claimed in claim 1, wherein a difference in a coefficient of thermal expansion between said mended defective portion that is mended by the mending material and the coating layer is approximately $1 \times 10^{-6}$/K or less, the mended defective portion having a smaller coefficient of thermal expansion than the coating layer.

10. The honeycomb structure as claimed in claim 1, wherein:
the plurality of cells form a honeycomb block having a peripheral face that is not cut;
the peripheral face of the honeycomb block corresponds to the peripheral wall; and
a difference in a coefficient of thermal expansion between a mended defective portion that is mended by the mending material and the coating layer is approximately $1 \times 10^{-6}$/K or less, the mended defective portion having a smaller coefficient of thermal expansion than the coating layer.

11. The honeycomb structure as claimed in claim 7, wherein the pigment includes at least one of CdS—CdSe, $Al_2O_3(Mn.P)$, $ZnO.(Cr.Al)_2O_3$, $CaO.SnO_2.SiO_2+Cr_2O_3$, $PbO.Sb_2O_5$, $TiO_2.Sb_2O_5.Cr_2O_3$, $SnO_2.V_2O_5$, $ZrO_2.V_2O_5$, $ZrO_2.SiO_2+PrO_2$, $(Cr.Al)_2O_3$, $(Zn.Co)O.(Al.Cr)_2O_3$, $3CaO(F).Cr_2O_3.3SiO_2$, $CoO.Al_2O_3$, $ZnO.CoO.Al_2O_3$, $CoO.Al_2O_3.SiO_2$, $ZnO.CoO.SiO_2$, $MgO.CoO.SiO_2$, $ZrO_2.SiO_2+V_2O_5$, $Zn(Al.Cr.Fe)_2O_3$, $(Co.Zn.Mn)O.(Al.Cr.Fe)_2O_3$, $SnO_2.Sb_2O_5$, antimony oxide, brown hematite, yellow ocher, ilmenite, Asbolite, CuO, $MnO_2$, $MnCO_3$, $MnHPO_4.3H_2O$, $Cr_2O_3$, $PbCrO_4$, $BaCrO_4$, $Cu_2(OH)_2CO_3$, cobalt oxide, cobalt carbonate, neodymium oxide, praseodymium oxide, cadmium sulfide, sodium uranium oxide, $V_2O_5$, $Ca_3(PO_4)_2$, $SnO_2$, $TiOZrSiO_4$, and $ZrO_2$.

12. The method of manufacturing a honeycomb structure as claimed in claim 1, the method comprising the steps of:
forming a peripheral wall composed of a coating layer dried, solidified, and formed on a peripheral portion of a honeycomb block, and forming a mended portion such that a defective portion that is formed on the peripheral wall of the honeycomb structure is mended with a mending material that is in a color different from a color of a material of the peripheral wall, the mended portion is dried and formed after mended with a mending material including a material identical to that of the coating layer.

13. The method of manufacturing the honeycomb structure as claimed in claim 12, wherein a plurality of defective portions are mended using a plurality of kinds of mending materials in a plurality of different colors.

14. The method of manufacturing the honeycomb structure as claimed in claim 12, wherein a drying temperature for drying the mending material arranged in the defective portion is lower than a drying temperature used in manufacturing the honeycomb structure before mending the defective portion.

15. The method of manufacturing the honeycomb structure as claimed in claim 14, wherein the drying temperature for drying the mending material is within a range of approximately 100° C. through approximately 300° C.

16. The method of manufacturing the honeycomb structure as claimed in claim 14, wherein the drying temperature used in manufacturing the honeycomb structure is within a range of approximately 500° C. through approximately 1000° C.

17. An exhaust gas treating apparatus comprising:
a honeycomb structure including:
a plurality of cells with holes arranged in a longitudinal direction; and
a peripheral wall surrounding said plurality of cells,
the peripheral wall is composed of a coating layer dried, solidified, and formed on a peripheral portion of a honeycomb block,
wherein said peripheral wall has a mended defective portion formed of a mending material that is in a color different from a color of a material of a remaining portion of the peripheral wall and
the mended portion is dried and formed after mending with a mending material including a material identical to that of the coating layer;
a supporting sealant member arranged at a periphery of the honeycomb structure; and
a metal container in which the honeycomb structure is accommodated.

18. The exhaust gas treating apparatus as claimed in claim 17, wherein a plurality of mended defective portions are mended using a plurality of kinds of mending materials in a plurality of different colors.

19. A method of manufacturing an exhaust gas treating apparatus, the method comprising:
forming a honeycomb structure including a plurality of cells with holes arranged in a longitudinal direction and a peripheral wall surrounding the plurality of cells;
mending a defective portion that is formed on the peripheral wall of the honeycomb structure with a mending material that is in a color different from a color of a material of the peripheral wall;
forming a supporting sealant member arranged at a periphery of the honeycomb structure; and
accommodating the honeycomb structure within a metal container.

20. The method of manufacturing the exhaust gas treating apparatus as claimed in claim 19, wherein a plurality of defective portions are mended by a plurality of kinds of mending materials in a plurality of different colors.

21. The method of manufacturing the exhaust gas treating apparatus as claimed in claim 19, further comprising a step of:

drying the mending material arranged in the defective portion;

wherein a drying temperature for drying the mending material arranged in the defective portion is lower than a drying temperature used in manufacturing the honeycomb structure before mending the defective portion.

22. The honeycomb structure of claim 1, wherein the honeycomb structure is incorporated within an exhaust gas treating apparatus.

23. The method of manufacturing the honeycomb structure as claimed in claim 12, wherein the cells arranged in the longitudinal direction make up a honeycomb block, and a coating layer is arranged on a peripheral face of the honeycomb block as the peripheral wall.

24. The method of manufacturing the honeycomb structure as claimed in claim 23, wherein the peripheral face of the honeycomb block is cut.

25. The method of manufacturing the honeycomb structure as claimed in claim 23, wherein the cells arranged in the longitudinal direction make up a honeycomb unit, and the honeycomb block is formed by bonding together a plurality of the honeycomb units by interposing an adhesive layer.

26. The method of manufacturing the honeycomb structure as claimed in claim 23, wherein the mending material includes a material of the coating layer.

27. The method of manufacturing the honeycomb structure as claimed in claim 12, wherein the holes of the plurality of cells are partitioned by partition walls, and the peripheral wall is made of a material identical to a material of the partition walls.

28. The method of manufacturing the honeycomb structure as claimed in claim 27, wherein the cells arranged in the longitudinal direction make up a honeycomb unit, and the honeycomb units are bonded together by interposing an adhesive layer.

29. The method of manufacturing the honeycomb structure as claimed in claim 27, wherein the mending material includes a material of the peripheral wall.

30. The method of manufacturing the honeycomb structure as claimed claim 12, wherein the mended defective portion is connected to at least one of the holes and a predetermined region of said at least one of the holes connected to the mended defective portion is sealed by the mending material.

31. The method of manufacturing the honeycomb structure as claimed in claim 12, wherein the mending material includes a pigment.

32. The method of manufacturing the honeycomb structure as claimed in claim 12, further comprising providing a catalyst carried by at least one of said plurality of cells.

33. The method of manufacturing the honeycomb structure as claimed in claim 23, wherein a difference in a coefficient of thermal expansion between said mended defective portion that is mended by the mending material and the coating layer is approximately $1\times10^{-6}$/K or less, the mended defective portion having a smaller coefficient of thermal expansion than the coating layer.

34. The method of manufacturing the honeycomb structure as claimed in claim 23, wherein:
the plurality of cells form a honeycomb block having a peripheral face that is not cut;
the peripheral face of the honeycomb block corresponds to the peripheral wall; and
a difference in a coefficient of thermal expansion between a mended defective portion that is mended by the mending material and the coating layer is approximately $1\times10^{-6}$/K or less, the mended defective portion having a smaller coefficient of thermal expansion than the coating layer.

35. The method of manufacturing the honeycomb structure as claimed in claim 31, wherein the pigment includes at least one of CdS—CdSe, $Al_2O_3(Mn.P)$, $ZnO.(Cr.Al)_2O_3$, $CaO.SnO_2.SiO_2+Cr_2O_3$, $PbO.Sb_2O_5$, $TiO_2.Sb_2O_5.Cr_2O_3$, $SnO_2.V_2O_5$, $ZrO_2.V_2O_5$, $ZrO_2.SiO_2+PrO_2$, $(Cr.Al)_2O_3$, $(Zn.Co)O.(Al.Cr)_2O_3$, $3CaO(F).Cr_2O_3.3SiO_2$, $CoO.Al_2O_3$, $ZnO.CoO.Al_2O_3$, $CoO.Al_2O_3.SiO_2$, $ZnO.CoO.SiO_2$, $MgO.CoO.SiO_2$, $ZrO_2.SiO_2+V_2O_5$, $Zn(Al.Cr.Fe)_2O_3$, $(Co.Zn.Mn)O.(Al.Cr.Fe)_2O_3$, $SnO_2.Sb_2O_5$, antimony oxide, brown hematite, yellow ocher, ilmenite, Asbolite, CuO, $MnO_2$, $MnCO_3$, $MnHPO_4.3H_2O$, $Cr_2O_3$, $PbCrO_4$, $BaCrO_4$, $Cu_2(OH)_2CO_3$, cobalt oxide, cobalt carbonate, neodymium oxide, praseodymium oxide, cadmium sulfide, sodium uranium oxide, $V_2O_5$, $Ca_3(PO_4)_2$, $SnO_2$, $TiOZrSiO_4$, and $ZrO_2$.

36. The exhaust gas treating apparatus as claimed in claim 17, wherein the cells arranged in the longitudinal direction make up a honeycomb block, and a coating layer is arranged on a peripheral face of the honeycomb block as the peripheral wall.

37. The exhaust gas treating apparatus as claimed in claim 36, wherein the peripheral face of the honeycomb block is cut.

38. The exhaust gas treating apparatus as claimed in claim 36, wherein the cells arranged in the longitudinal direction make up a honeycomb unit, and the honeycomb block is formed by bonding together a plurality of the honeycomb units by interposing an adhesive layer.

39. The exhaust gas treating apparatus as claimed in claim 36, wherein the mending material includes a material of the coating layer.

40. The exhaust gas treating apparatus as claimed in claim 17, wherein the holes of the plurality of cells are partitioned by partition walls, and the peripheral wall is made of a material identical to a material of the partition walls.

41. The exhaust gas treating apparatus as claimed in claim 40, wherein the cells arranged in the longitudinal direction make up a honeycomb unit, and the honeycomb units are bonded together by interposing an adhesive layer.

42. The exhaust gas treating apparatus as claimed in claim 40, wherein the mending material includes a material of the peripheral wall.

43. The exhaust gas treating apparatus as claimed claim 17, wherein the mended defective portion is connected to at least one of the holes and a predetermined region of said at least one of the holes connected to the mended defective portion is sealed by the mending material.

44. The exhaust gas treating apparatus as claimed in claim 17, wherein the mending material includes a pigment.

45. The exhaust gas treating apparatus as claimed in claim 17, further comprising a catalyst carried by at least one of said plurality of cells.

46. The exhaust gas treating apparatus as claimed in claim 36, wherein a difference in a coefficient of thermal expansion between said mended defective portion that is mended by the mending material and the coating layer is approximately $1\times10^{-6}$/K or less, the mended defective portion having a smaller coefficient of thermal expansion than the coating layer.

47. The exhaust gas treating apparatus as claimed in claim 36, wherein:
the plurality of cells form a honeycomb block having a peripheral face that is not cut;
the peripheral face of the honeycomb block corresponds to the peripheral wall; and a difference in a coefficient of thermal expansion between a mended defective portion that is mended by the mending material and the coating layer is approximately $1 \times 10^{-6}$/K or less, the mended defective portion having a smaller coefficient of thermal expansion than the coating layer.

48. The exhaust gas treating apparatus as claimed in claim 44, wherein the pigment includes at least one of CdS—CdSe, $Al_2O_3(Mn.P)$, $ZnO.(Cr.Al)_2O_3$, $CaO.SnO_2.SiO_2+Cr_2O_3$, $PbO.Sb_2O_5$, $TiO_2.Sb_2O_5.Cr_2O_3$, $SnO_2.V_2O_5$, $ZrO_2.V_2O_5$, $ZrO_2.SiO_2+PrO_2$, $(Cr.Al)_2O_3$, $(Zn.Co)O.(Al.Cr)_2O_3$, $3CaO(F).Cr_2O_3.3SiO_2$, $CoO.Al_2O_3$, $ZnO.CoO.Al_2O_3$, $CoO.Al_2O_3.SiO_2$, $ZnO.CoO.SiO_2$, $MgO.CoO.SiO_2$, $ZrO_2.SiO_2+V_2O_5$, $Zn(Al.Cr.Fe)_2O_3$, $(Co.Zn.Mn)O.(Al.Cr.Fe)_2O_3$, $SnO_2.Sb_2O_5$, antimony oxide, brown hematite, yellow ocher, ilmenite, Asbolite, CuO, $MnO_2$, $MnCO_3$, $MnHPO_4.3H_2O$, $Cr_2O_3$, $PbCrO_4$, $BaCrO_4$, $Cu_2(OH)_2CO_3$, cobalt oxide, cobalt carbonate, neodymium oxide, praseodymium oxide, cadmium sulfide, sodium uranium oxide, $V_2O_5$, $Ca_3(PO_4)_2$, $SnO_2$, $TiOZrSiO_4$, and $ZrO_2$.

49. The method of manufacturing the exhaust gas treatment apparatus as claims in claim 19, further comprising:
arranging the cells with holes in a longitudinal direction to be separated by a plurality of partitioning walls also extending in a longitudinal direction, wherein each cell has an inlet end and an outlet end; and
sealing the inlet side ends and outlet side ends of the cells in an alternating arrangement such that within every cell, exactly one of either the inlet side or outlet side hole is sealed, thereby requiring that exhaust air will be forced through the partitioning walls.

50. The method of manufacturing the exhaust gas treatment apparatus as claimed in claim 19, wherein the cells arranged in the longitudinal direction make up a honeycomb block, and a coating layer is arranged on a peripheral face of the honeycomb block as the peripheral wall.

51. The method of manufacturing the exhaust gas treatment apparatus as claimed in claim 50, wherein the peripheral face of the honeycomb block is cut.

52. The method of manufacturing the exhaust gas treatment apparatus as claimed in claim 50, wherein the cells arranged in the longitudinal direction make up a honeycomb unit, and the honeycomb block is formed by bonding together a plurality of the honeycomb units by interposing an adhesive layer.

53. The method of manufacturing the exhaust gas treatment apparatus as claimed in claim 50, wherein the mending material includes a material of the coating layer.

54. The method of manufacturing the exhaust gas treatment apparatus as claimed in claim 19, wherein the holes of the plurality of cells are partitioned by partition walls, and the peripheral wall is made of a material identical to a material of the partition walls.

55. The method of manufacturing the exhaust gas treatment apparatus as claimed in claim 54, wherein the cells arranged in the longitudinal direction make up a honeycomb unit, and the honeycomb units are bonded together by interposing an adhesive layer.

56. The method of manufacturing the exhaust gas treatment apparatus as claimed in claim 54, wherein the mending material includes a material of the peripheral wall.

57. The method of manufacturing the exhaust gas treatment apparatus as claimed claim 19, wherein the mended defective portion is connected to at least one of the holes and a predetermined region of said at least one of the holes connected to the mended defective portion is sealed by the mending material.

58. The method of manufacturing the exhaust gas treatment apparatus as claimed in claim 19, wherein the mending material includes a pigment.

59. The method of manufacturing the exhaust gas treatment apparatus as claimed in claim 19, further comprising providing a catalyst carried by at least one of said plurality of cells.

60. The method of manufacturing the exhaust gas treatment apparatus as claimed in claim 50, wherein a difference in a coefficient of thermal expansion between said mended defective portion that is mended by the mending material and the coating layer is approximately $1 \times 10^{-6}$/K or less, the mended defective portion having a smaller coefficient of thermal expansion than the coating layer.

61. The method of manufacturing the exhaust gas treatment apparatus as claimed in claim 50, wherein:
the plurality of cells form a honeycomb block having a peripheral face that is not cut;
the peripheral face of the honeycomb block corresponds to the peripheral wall; and
a difference in a coefficient of thermal expansion between a mended defective portion that is mended by the mending material and the coating layer is approximately $1 \times 10^{-6}$/K or less, the mended defective portion having a smaller coefficient of thermal expansion than the coating layer.

62. The method of manufacturing the exhaust gas treatment apparatus as claimed in claim 58, wherein the pigment includes at least one of CdS—CdSe, $Al_2O_3(Mn.P)$, $ZnO.(Cr.Al)_2O_3$, $CaO.SnO_2.SiO_2+Cr_2O_3$, $PbO.Sb_2O_5$, $TiO_2.Sb_2O_5.Cr_2O_3$, $SnO_2.V_2O_5$, $ZrO_2.V_2O_5$, $ZrO_2.SiO_2+PrO_2$, $(Cr.Al)_2O_3$, $(Zn.Co)O.(Al.Cr)_2O_3$, $3CaO(F).Cr_2O_3.3SiO_2$, $CoO.Al_2O_3$, $ZnO.CoO.Al_2O_3$, $CoO.Al_2O_3.SiO_2$, $ZnO.CoO.SiO_2$, $MgO.CoO.SiO_2$, $ZrO_2.SiO_2+V_2O_5$, $Zn(Al.Cr.Fe)_2O_3$, $(Co.Zn.Mn)O.(Al.Cr.Fe)_2O_3$, $SnO_2.Sb_2O_5$, antimony oxide, brown hematite, yellow ocher, ilmenite, Asbolite, CuO, $MnO_2$, $MnCO_3$, $MnHPO_4.3H_2O$, $Cr_2O_3$, $PbCrO_4$, $BaCrO_4$, $Cu_2(OH)_2CO_3$, cobalt oxide, cobalt carbonate, neodymium oxide, praseodymium oxide, cadmium sulfide, sodium uranium oxide, $V_2O_5$, $Ca_3(PO_4)_2$, $SnO_2$, $TiOZrSiO_4$, and $ZrO_2$.

63. The honeycomb structure as claimed in claim 1, comprising an outer wall on a peripheral portion of the honeycomb block.

64. The method as claimed in claim 12, wherein the honeycomb structure includes an outer wall on a peripheral portion of the honeycomb block.

65. The method as claimed in claim 19, therein the honeycomb structure includes an outer wall on a peripheral portion of the honeycomb block.

* * * * *